United States Patent
Raghunathan et al.

(10) Patent No.: US 11,677,852 B2
(45) Date of Patent: Jun. 13, 2023

(54) CROSS-APPLICATION DATA MIGRATION

(71) Applicant: SAP SE, Walldorf (DE)

(72) Inventors: Ranjith Raghunathan, Bangalore (IN); Ambika Parmar, New Delhi (IN); Ankit Maskara, Bihar (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/498,282

(22) Filed: Oct. 11, 2021

(65) Prior Publication Data
US 2023/0113443 A1 Apr. 13, 2023

(51) Int. Cl.
H04L 12/00 (2006.01)
H04L 67/565 (2022.01)
H04L 67/00 (2022.01)
G06F 16/25 (2019.01)
G06F 16/22 (2019.01)
H04L 67/568 (2022.01)

(52) U.S. Cl.
CPC .......... H04L 67/565 (2022.05); G06F 16/221 (2019.01); G06F 16/2282 (2019.01); G06F 16/256 (2019.01); H04L 67/34 (2013.01); H04L 67/568 (2022.05)

(58) Field of Classification Search
CPC ..... H04L 67/565; H04L 67/34; H04L 67/568; G06F 16/221; G06F 16/2282; G06F 16/256
USPC ............................ 709/246, 220, 226; 726/15
See application file for complete search history.

(56) References Cited

U.S. PATENT DOCUMENTS

| | | | |
|---|---|---|---|
| 7,269,606 B2 | 9/2007 | Dittrich et al. | |
| 10,579,698 B2 | 3/2020 | Arning et al. | |
| 10,616,127 B1 * | 4/2020 | Suit | G06F 9/5088 |
| 10,616,337 B1 * | 4/2020 | Satyanarayana | H04L 67/1097 |
| 11,366,723 B2 * | 6/2022 | Bansod | G06F 11/1451 |
| 2014/0115161 A1 * | 4/2014 | Agarwal | H04L 41/18 709/226 |
| 2014/0156813 A1 * | 6/2014 | Zheng | H04L 67/10 709/220 |

(Continued)

FOREIGN PATENT DOCUMENTS

CN 113901033 A * 1/2022 ......... H04L 67/1097

OTHER PUBLICATIONS

"10-Step Methodology to Creating a Single View of your Business", MongoDB, Inc., (Feb. 2017), 14 pgs.

(Continued)

*Primary Examiner* — Frantz Coby
(74) *Attorney, Agent, or Firm* — Schwegman Lundberg & Woessner, P.A.

(57) ABSTRACT

Various examples are directed to systems and methods for migrating persistences of a plurality of source applications to a target environment. A migration tool may access a first source table and a second source table. The migration tool may generate mapping data relating the first source table and the second source table to a unified table, the mapping data relating a first field of the first source table to a first column of the unified table, the mapping data also relating a first field of the second source table to the first column of the unified table. The migration tool may migrate migration data from the first source table and the second source table to the unified table at a database management system executing at the target environment using the mapping data.

20 Claims, 9 Drawing Sheets

(56) References Cited

U.S. PATENT DOCUMENTS

| | | | | |
|---|---|---|---|---|
| 2015/0096011 | A1* | 4/2015 | Watt | G06F 3/0647 |
| | | | | 726/15 |
| 2016/0036724 | A1* | 2/2016 | Syed | H04L 41/5025 |
| | | | | 709/226 |
| 2016/0323147 | A1* | 11/2016 | Kirsch, II | H04L 41/0886 |
| 2016/0373289 | A1* | 12/2016 | Hernandez | H04L 41/16 |
| 2017/0344599 | A1 | 11/2017 | K et al. | |
| 2018/0191599 | A1* | 7/2018 | Balasubramanian | |
| | | | | G06F 9/5072 |
| 2019/0253485 | A1* | 8/2019 | Jyoti Banerjee | H04L 67/1097 |
| 2019/0384519 | A1* | 12/2019 | Danilov | G06F 3/064 |
| 2020/0089515 | A1* | 3/2020 | Hari | H04L 41/5009 |
| 2020/0089746 | A1* | 3/2020 | Argyros | G06F 16/93 |
| 2021/0065090 | A1* | 3/2021 | Chatterjee | G06N 3/045 |
| 2021/0081256 | A1* | 3/2021 | Sathyanaraya | G06F 9/541 |
| 2022/0272157 | A1* | 8/2022 | Kairali | H04L 67/34 |
| 2022/0407907 | A1* | 12/2022 | Cheng | H04L 67/10 |
| 2022/0413903 | A1* | 12/2022 | Kalley | H04L 9/0825 |

OTHER PUBLICATIONS

"Astera Centerprise", Astera Software, (Accessed Aug. 18, 2021), 5 pgs.

"Salesforce Announces Customer 360 Truth—A Single Source of Truth for Every Customer Across the World's #1 CRM", Salesforce,com, [Online], Retrieved from the Internet: <URL: https://www.salesforce.com/>, (Nov. 19, 2019), 7 pgs.

"Unified Storage", [Online], Retrieved from the Internet: <URL: https://www.delltechnologies.com/>, (Accessed Aug. 18, 2021), 4 pgs.

Kalali, Masoud, "Data Management: The Missing Link in Your SOA Strategy", Integration Zone, [Online]. Retrieved from the Internet: <URL: https://dzone.com/>, (Aug. 5, 2008), 4 pgs.

McClure, Terri, "Unified data storage adoption rate rising among users", 6 Best Practices for Reducing Your Data Storage Footprint. SearchStorage.com E-Guide, [Online], Retrieved from the Internet: <URL: http://docs.media.bitpipe.com/>, (Accessed Aug. 18, 2021), 4 pgs.

\* cited by examiner

CROSS-APPLICATION DATA MIGRATION

BACKGROUND

Traditionally, software has been self-contained and executed on one or more local machines. An enterprise desiring to use a software tool builds an on-premises computing system including servers and data storage and executes a software application to provide the tool on that computing system. The software application may be developed by the enterprise and/or purchased from a third party software provider. Users access the software tool directly from the computing system or remotely via a networked user computing device.

BRIEF DESCRIPTION OF DRAWINGS

The present disclosure is illustrated by way of example and not limitation in the following figures.

DETAILED DESCRIPTION

Figure 1:
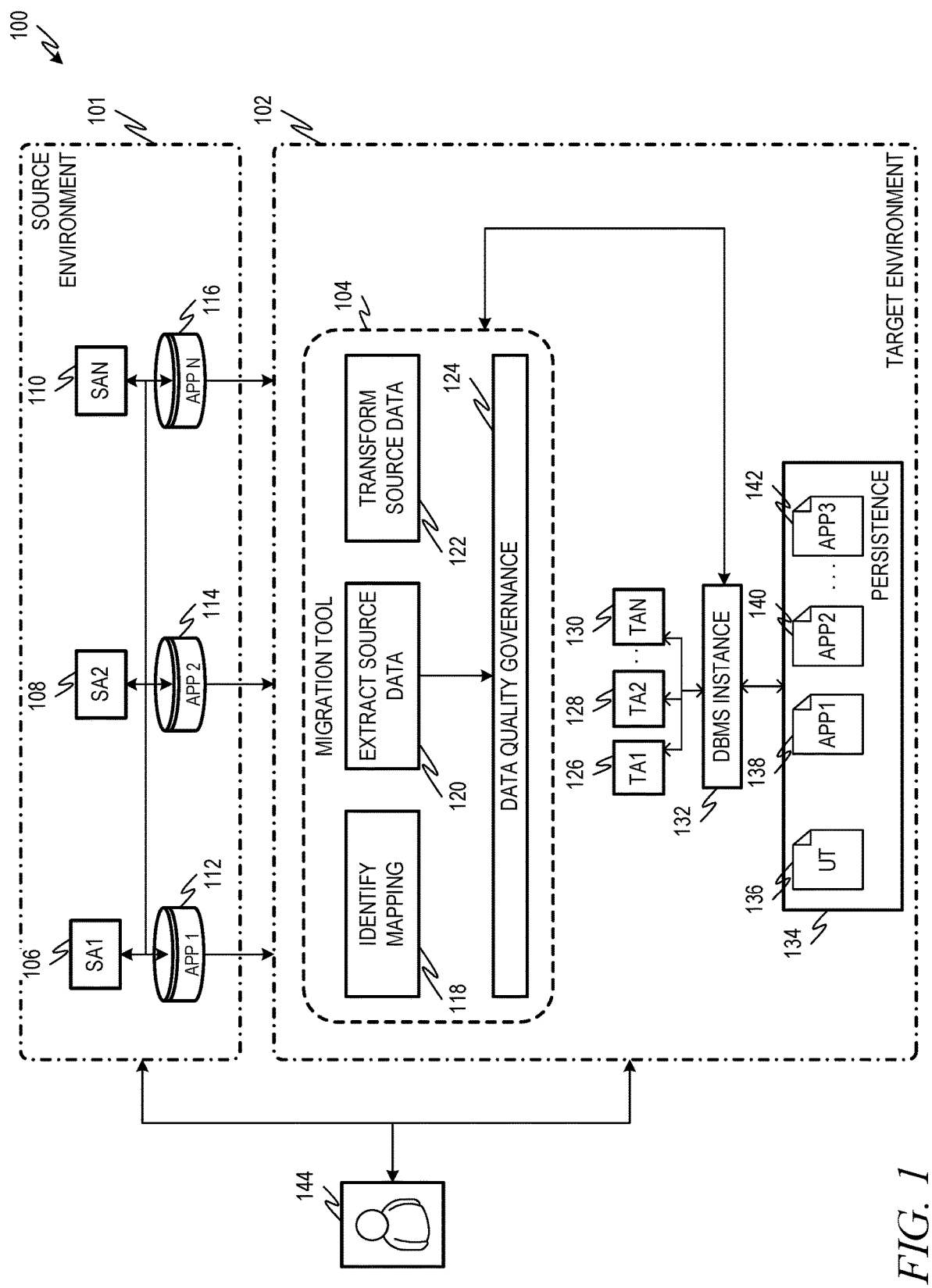
FIG. 1 is a diagram showing one example of an arrangement including a migration tool.

Applications developed to execute in an on-premises environment are often arranged to utilize distinct data persistence arrangements. For example, different on-premises applications may have their own database or databases, storing data in different schemas, tables, joins, queries, and the like. For enterprises that execute multiple applications, this can lead to data duplication. Consider an example arrangement with an inventory management application and a sales management application. Both applications use material identifiers that identify different materials that can be stocked, sold, and/or the like. The inventory management application uses material identifiers in data records that track or otherwise describe the material in inventory. The sales management application may also use the material identifiers to track materials that are sold to a third party. Accordingly, the data persistence of the inventory management application and the data persistence of the sales management application may store instances of the material identifiers.

Another challenge associated with on-premises applications having distinct persistencies is the prevalence of cross-application processes. For example, many applications access transactional data created by other applications. Consider, for example, an enterprise that executes end-to-end (E2E) business processes like order-to-cash, procure-to-pay, hire-to-retire, and the like. Applications that execute these and similar processes may utilize data stored at the persistencies of multiple different applications. For example, an order-to-cash process may access the persistence of both an example inventory management application and the persistence of the sales management application indicated above. As a result of this, many on-premises and other applications are developed with data layers. The data layers implement logic for accessing multiple different persistencies, for example, having different schemas, tables, joins, queries, and the like at different application databases.

In various examples, one or more legacy on-premises applications are migrated to a target environment, such as a cloud environment. Many existing data migration approaches, however, compound problems of data duplication and application complexity. For example, many cloud migration approaches simply duplicate existing on-premises application persistencies into cloud databases, in-memory and/or cheap data stores. In this approach, cloud-migrated applications continue to interact with one another, replicating and duplicating data across their application persistencies and thereby increasing the data footprint.

Various examples address these and other challenges by providing a target environment comprising a database having a unified table that is common to multiple target applications. In some examples, the target environment is a cloud environment and the target applications are configured as cloud applications. A migration tool may map source tables from source applications to the unified table. The unified table is implemented as a component of a database at the target environment. Target versions of the source applications are configured to use the unified table. In this way, the target applications may be simplified. In some examples, the target applications may omit a data layer and may, instead, be mapped to the unified table. Because the target application data is stored predominately at the unified table, logic for accessing multiple databases and large numbers of tables may be omitted.

Consider an example in which data is created in one application and is subsequently used by one or more other applications. In various examples, the data may be stored at a unified table, allowing the one or more other applications to access the data directly from the unified table rather than utilizing a data layer, middleware system, or other intermediate component. In addition to allowing applications to directly access the unified table, various arrangements described herein may reduce data storage used at the target environment. For example, because target applications access a common unified table, data duplication may be reduced.

The migration tool and other arrangements described herein may be utilized in various different contexts. In some examples, the migration tool may be used to migrate the persistences of one or more legacy on-premises applications to a target environment, such as a cloud environment. In other examples, the migration tool may be used to migrate the persistence of a new application to the target environment. For example, data from the unified table may be modified to include data from the new application, allowing the new application to execute advantageously in the target environment.

FIG. 1 is a diagram showing one example of an arrangement 100 including a migration tool 104. Source applications 106, 108, 110 are associated with source application databases 112, 114, 116. The migration tool 104 migrates data from the source application databases 112, 114, 116 to a database management system (DBMS) instance 132 executing at the target environment 102. Data from multiple source application database and/or multiple tables thereof may be consolidated at a unified table 136 stored at a persistence 134 of the DBMS instance 132, as described herein. Target applications 126, 128, 130 executing at the target environment 102 may perform functionality similar to that of the source applications 106, 108, 110 and may utilize the unified table 136 as described herein.

The source environment 101 comprises one or more source applications 106, 108, 110 and associated source application databases 112, 114, 116. In some examples, the source environment 101 is or includes an on-premises computing system that may be provided and managed by an enterprise executing the applications 106, 108, 110. In other examples, the source environment 101 is or includes a cloud environment (e.g. other than the target environment 102). In some examples, the source environment 101 is or includes a private cloud environment. In some examples, the source environment 101 is a development and/or testing environment. For example, one or more of the source applications 106, 108, 110 may be developed and/or tested at the source environment 101 and then migrated to the target environment 102 using the migration tool 104.

A user group 144 may access the source environment 101 to use the source applications 106, 108, 110, develop one or more of the source applications 106, 108, 110, and/or test the source applications 106, 108, 110 using one or more user computing devices, such as mobile computing devices, laptop computing devices, desktop computing devices, and the like. Users of the user group 144 may be associated with the entity implementing the source environment 101.

The target environment 102 includes one or more computing devices, such as servers or the like, configured to execute target applications 126, 128, 130. In some examples, the target environment 102 is or includes an on-premises computing system that may be provided and managed by an enterprise executing the applications 126, 128, 130. In other examples, the target environment 102 is or includes a cloud environment, such as a private cloud environment or a public cloud environment.

The target environment 102 executes the DBMS instance 132 and target applications 126, 128, 130. The target environment 102 may include one or more data centers implementing one or more virtual and/or hardware servers for implementing the migration tool 104, DBMS instance 132, persistence 134 and target applications 126, 128, 130. For example, instances of the DBMS instance 132 and/or target applications 126, 128, 130 may execute at the target environment 102 as a set of one or more virtual machines and/or containers executing at the target environment 102.

The user group 144 may access the target environment 102 (e.g., the target applications 126, 128, 130) using user computing devices. In some examples, an entity associated with the user group 144 purchases a tenancy at the target environment 102 for executing the target applications 126, 128, 130, the DBMS instance 132 and for implementing the persistence 134. The user group 144 in FIG. 1 is the same user group 144 that accesses the source environment 101, although this may not always be the case. For example, the target applications 126, 128, 130, in some examples, are arranged for use by a different user group than the source applications 106, 108, 110. Also, in some examples, after the source application databases 112, 114, 116 are migrated to the target environment 102, as described herein, the access of the user group 144 to the source environment 101 may be limited or removed.

In the example of FIG. 1, the target environment 102 also executes the migration tool 104. The migration tool 104 migrates data stored at the application databases 112, 114, 116 to a database management system (DBMS) instance 132 executing at the target environment 102. The migration tool 104 may arrange the migrated data into a unified table 136 and one or more optional custom application tables 138, 140, 142. Target applications 126, 128, 130 may, for example, execute functionality similar to the functionality of the source applications 106, 108, 110. The target applications 126, 128, 130 may be mapped to the unified table 136. In this way, in some examples, target applications 126, 128, 130 may omit a data layer, as described herein.

The migration tool 104 migrates data from the respective source application databases 112, 114, 116 to the DBMS instance 132 at the target environment 102. In the example of FIG. 1, the migration tool 104 is implemented in the target environment 102 although, in other examples, the migration tool 104 may be implemented in other infrastructure such as, for example, at a different cloud environment and/or by an on-premises computing system.

The migration tool 104 comprises an identify mapping sub-tool 118, an extract source data sub-tool 120, a transform source data sub-tool 122 and a data quality governance sub-tool 124. The identify mapping sub-tool 118 accesses various tables at the source application databases 112, 114, 116 and generates a mapping between fields at the legacy database tables and columns of the unified table 136. The extract source data sub-tool 120 extracts data from the application databases 112, 114, 116 and stores the data at a staging data structure. The staging data structure may be stored for example at the persistence 134 or another persistence at the target environment 102. The transform source data sub-tool 122 may transform data from the staging data structure into the unified table 136 and optional custom application tables 138, 140, 142.

Although one unified table 136 is shown in FIG. 1, it will be appreciated that various examples of the target environment 102 can include multiple unified tables. For example, different unified tables may consolidate data in different domains. For example, data relating to an accounting journal domain may be stored at a unified table and set of custom application tables for the accounting journal domain. Data related to a material or inventory management domain may be stored at a unified table and set of custom application tables for the material or inventory management domain. Consider, for example, the ACDOCA table in the FI module and the MATDOC table in the MM modules, both available as part of the S/4 HANA® product available from SAP SE of Waldorf, Germany. Data related to the ACDOCA table may be stored at a common unified table for the accounting journal domain while data related to the MATDOC table may be stored at a common unified table for the material or inventory management domain. Other domains with corresponding unified tables are also contemplated in addition to or instead of an accounting journal entry domain and a material or inventory management domain.

Figure 2:
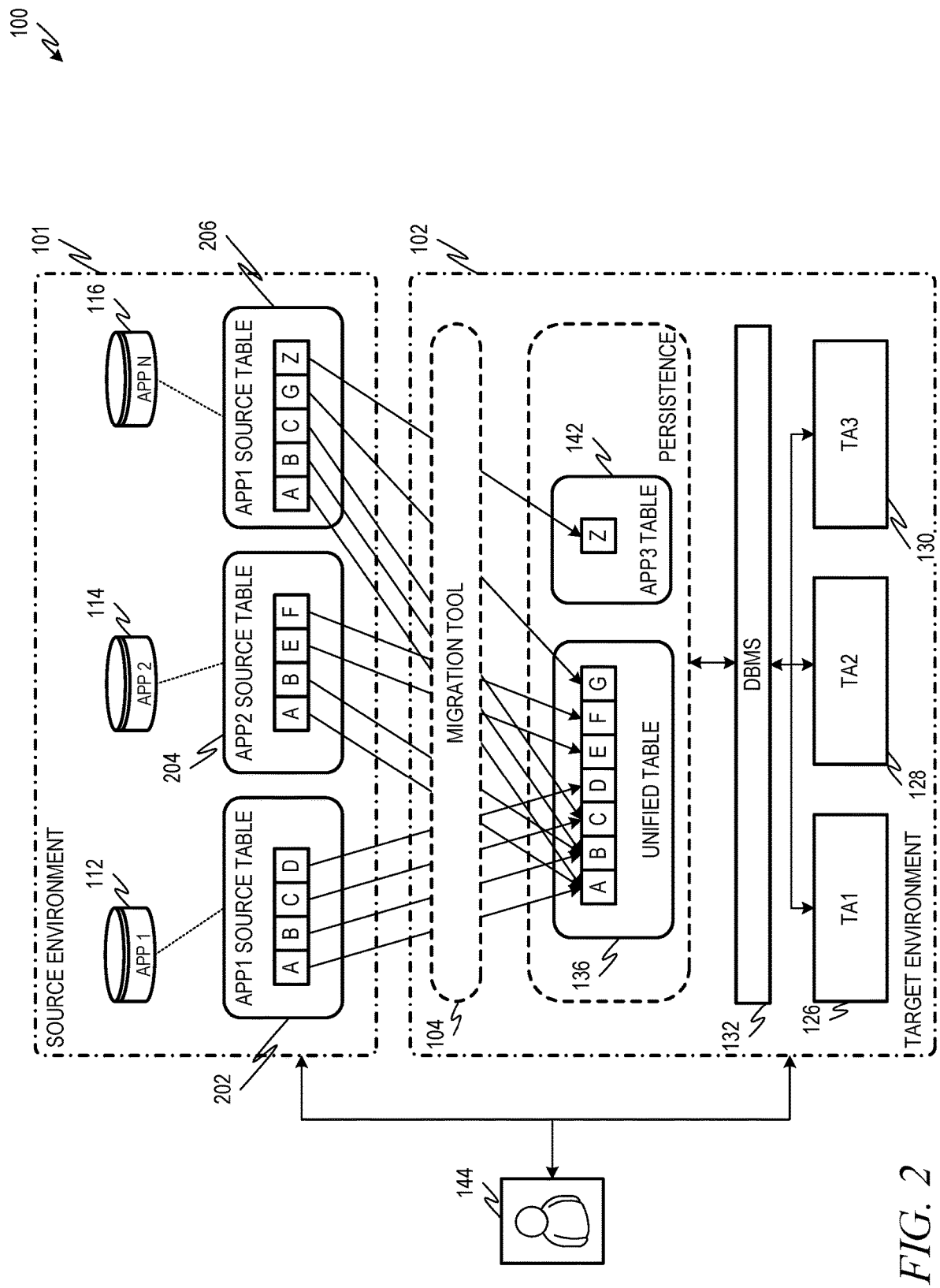
FIG. 2 is a diagram showing another example of the arrangement of FIG. 1 to demonstrate data migration.

FIG. 2 is a diagram showing another example of the arrangement 100 to demonstrate data migration. In the example of FIG. 2, the source application database 112 includes a source table 202. The source application database 114 includes a source table 204 and the source application database 116 includes a source table 206. In this example, records in the source table 202 include fields labeled A, B, C, and D. Records in the source table 204 include fields labeled A, B, E, and F. Records in the source table 206 include records A, B, C, G, and Z.

Consider again the example above regarding a material identifier. In one example, the source tables 202, 204, 206. In this example, A may refer to the material identifier. The source table 202, 204, 206 may include records describing various transactions and/or other data about the material. For example, the source table 202 may include records describing transactions for purchasing material, the source table 204 may include records describing work orders for manufacturing products using materials. The source table 206 may include records describing sales transactions for selling the material to a third party. As shown, however, the different records of the source tables 202, 204, 206 may include common fields.

Consider another example in which the fields A and B are first and last names. In this example, the source table 202 may include human resource records describing employees' names. The source table 204 may include payroll records for the employees. The source table 206 may include travel expense records describing business trips taken by the employees. Again, however, the different source tables 202, 204, 206 include duplicate fields.

The migration tool 104 may arrange the fields of the source tables 202, 204, 206 into columns of the unified table 136. In some examples, the unified table 136 is a columnar table. A columnar table is a table in which records are stored by column instead of by row. Consider the following example

TABLE 1

| Row ID | Material Identifier | Cost | Units | Delivery Date |
|--------|--------------------|------|-------|---------------|
| 01 | 34kfa | $ 3.29 | 342 | Aug. 19, 2021 |
| 02 | 8kfed9 | $20.53 | 4 | Oct. 21, 2021 |
| 03 | 0klad8 | $ 0.32 | 5428 | Sep. 15, 2021 |
| ... | ... | ... | ... | ... |

In a row-oriented table, a DBMS might store the example records above by row. For example, the data might be ordered as given by example FRAGMENT 1 below:
Fragment 1:
1; 34kf8a; 3.29; 342; 8/19/21;
2; 8kfed9; 20.53; 4; 10/21/21;
3; 0klad8; 0.32; 5428; 9/15/21;
. . .
In a columnar or column-oriented table, data is stored instead by column, as demonstrated by example FRAGMENT 2 below:
Fragment 2:
34kf8a:01; 8kfed9:02; 0klad8:03;
3.29:01; 20.53:02; 0.32:03;
342:01; 4:02; 5428:03;
8/19/21:01; 10/21/21:02; 9/15/21:03;
. . .
In the example columnar arrangement shown by FRAGMENT 2, because the columns are arranged together, the process of adding a column to the table may be simplified.

In the example of FIG. 2, the migration tool 104 generates a mapping from the source tables 202, 204, 206 to the unified table 136, shown by the indicated arrows. For example, source tables 202, 204, and 204 all have record fields A and B, which are mapped to columns A and B at the unified table 136. Source table 202 also includes fields C and D, which are mapped to columns C and D of the unified table 136. Source table 204 includes field C, which is mapped to column C as well as fields G and Z. Field G is mapped to column G at the unified table 136.

In this example, field Z, is a custom field and is mapped to the custom application table 142. A custom field, such as the field Z, is a field that is not used by the other source applications or client applications. For example, a custom field may be defined by a customer or user of the source application 110 and/or target application 130. The migration tool 104 may determine that the field Z is a custom field and may map the field Z to the custom application table 142 for the application that uses the field Z, as shown.

FIG. 2 also demonstrates example data storage savings that may be achieved in the target environment 102 relative to the source environment 101. For example, in example of FIG. 2, columns A, B, and C are duplicated across multiple source tables 202, 204, 206, meaning that the data stored at columns A, B, and C is stored multiple times at the source environment 101. At the target environment 102, the columns A, B, C of the unified table 136 are not duplicated, meaning that data storage needs at the target environment 102 may be less than at the source environment 101.

Figure 3:
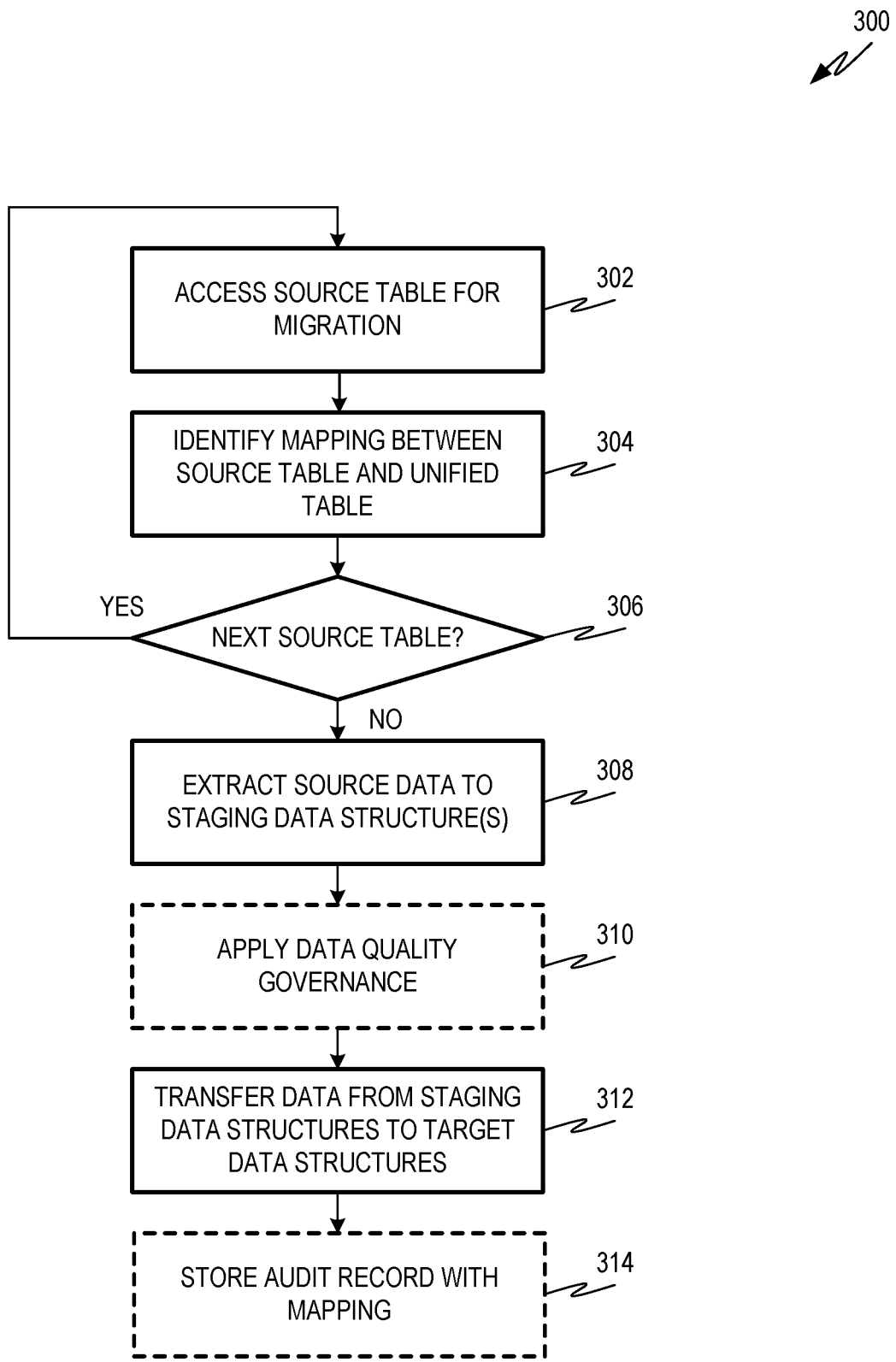
FIG. 3 is a flowchart showing one example of a process flow that may be executed in the arrangement of FIG. 1 to migrate data from one or more source application source tables to a target DBMS including a unified table.

FIG. 3 is a flowchart showing one example of a process flow 300 that may be executed in the arrangement 100 to migrate data from one or more source application source tables, such as the source tables 202, 204, 206 to a target DBMS, such as the DBMS instance 132 including the unified table 136. At operation 302, the migration tool 104 accesses a source table. The source table may be, for example, one of the source tables 202, 204, 206 of FIG. 2 or any other tables from the source application databases 112, 114, 116.

At operation 304, the migration tool 104 (e.g., the identify mapping sub-tool 118) may determine a mapping between the source table and the DBMS instance 132. For example, fields of the source table may be mapped to the unified table 136 and/or to the appropriate custom application table 138, 140, 142. Fields from the source table that are not custom may be mapped to corresponding columns at the unified table 136. This may include, for example, appending a new column to the unified table 136 and/or generating a mapping to an existing column of the unified table 136. Fields at the source table that custom fields not used by other applications may be mapped to the custom application table 138, 140, 142 corresponding to the application using the field. Additional examples describing how the mapping data may be generated are provided herein with respect to FIG. 4.

At operation 306, the migration tool 104 determines if there are any additional source tables at the source application databases 112, 114, 116 that have yet to be considered. If there are source tables to be considered, the migration tool 104 may return to operation 302 to access the next source table. When all source tables have been considered, the migration tool (e.g., the extract source data sub-tool 120) may extract source data from the various source tables, at operation 308, and write the source data to one or more staging data structures. The staging data structures may be stored at the target environment 102 and, in some examples, at the persistence 134 managed by the DBMS instance 132.

At optional operation 310, the migration tool 104 (e.g., the data quality governance sub-tool 124 thereof) may apply data quality governance rules to the extracted data. The data quality governance rules may include one or more rules that verify the consistency of the data with itself and with the unified table 136 and associated custom application tables 138, 140, 142. Data quality governance rules may be selected to avoid duplicate entries of master data. For example, if a new master data record is being migrated into the unified table, the governance rule will check against different agreed combination fields with match scores and propose duplicate entries that a user or user group may manually validate and confirm migration of the record as a new entry or as an update against an existing entry. In some examples, data quality governance can be related to mapping the data into the data format (e.g., data type or data length) of target table from source table while maintaining its integrity. In some examples, a data quality governance rule may include one or more Boolean values stored as "Yes/No", "True/False" or "X/(Space)."

At operation 312, the migration tool 104 (e.g., the transform source data sub-tool 122) transfers the migrated data from the staging data structure to the persistence 134 including, for example, to the unified table 136 and/or to the custom application tables 138, 140, 142, for example, according to the mapping data determined at operation 304.

At optional operation 314, the migration tool 104 may store an audit record indicating the mapping from the source application database source tables to the unified table 136 and/or custom application tables 138, 140, 142. The audit record may include a table or other data structure including the mapping data generated at operation 304. The audit record may be used, for example, to detect and correct any errors that may have occurred in the migration and/or to duplicate the migration in other systems.

Figure 4:
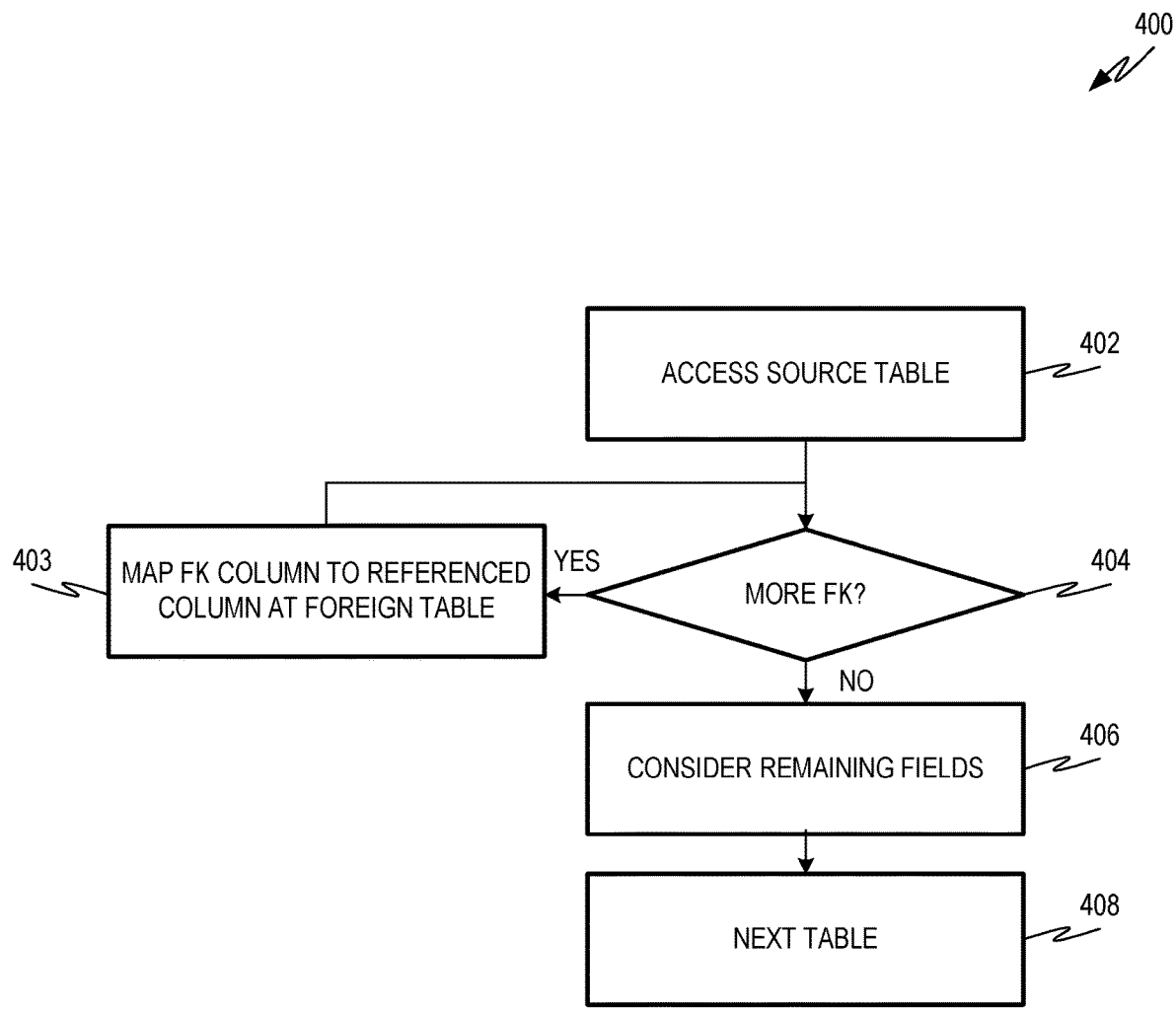
FIG. 4 is a flowchart showing one example of a process flow that may be executed in the arrangement of FIG. 1 to generate as mapping from one or more source tables to a unified table and/or custom application tables.

FIG. 4 is a flowchart showing one example of a process flow 400 that may be executed in the arrangement 100 of FIG. 1 to generate as mapping from one or more source tables to a unified table 136 and/or custom application tables 138, 140, 142. For example, the process flow 400 may be executed by the identify mapping sub-tool 118 or another component of the migration tool 104. Also, for example, the process flow 400 shows one example way of executing the operation 304 of the process flow 300.

At operation 402, the migration tool 104 accesses a source table. At operation 404, the migration tool 104 determines a first foreign key (if any) among the fields of the source table. A foreign key is a record field that points to records at a different table in the same database or a different database. For example, a foreign key in the source table is duplicated at the table to which it refers. If a foreign key is found at operation 404, the migration tool 104, at operation 403 generates a mapping from the field including the foreign key to a corresponding column at the unified table 136. In some examples, mapping the foreign key field to the unified table may be performed in a way that permits the mapping data to reference a column at the unified table 136 that has previously been mapped to a different source table field. For example, a source table field including a foreign key may be a duplicate field, at least of the field to which the foreign key refers. After generating the mapping data at operation 403, the migration tool 104 may check for a next foreign key field at operation 404.

If no foreign keys or no additional foreign keys are found at operation 404, the migration tool 104 may consider any remaining fields from the source table at operation 406. For example, the migration tool 104 may determine whether any of the remaining fields are custom fields to the relevant application. Custom fields may be mapped to columns at the appropriate custom application table 138, 140, 142. Fields that are not custom fields may be mapped to the unified table, 136. At operation 408, the migration tool 104 may consider the next source table (if any).

Figure 5:
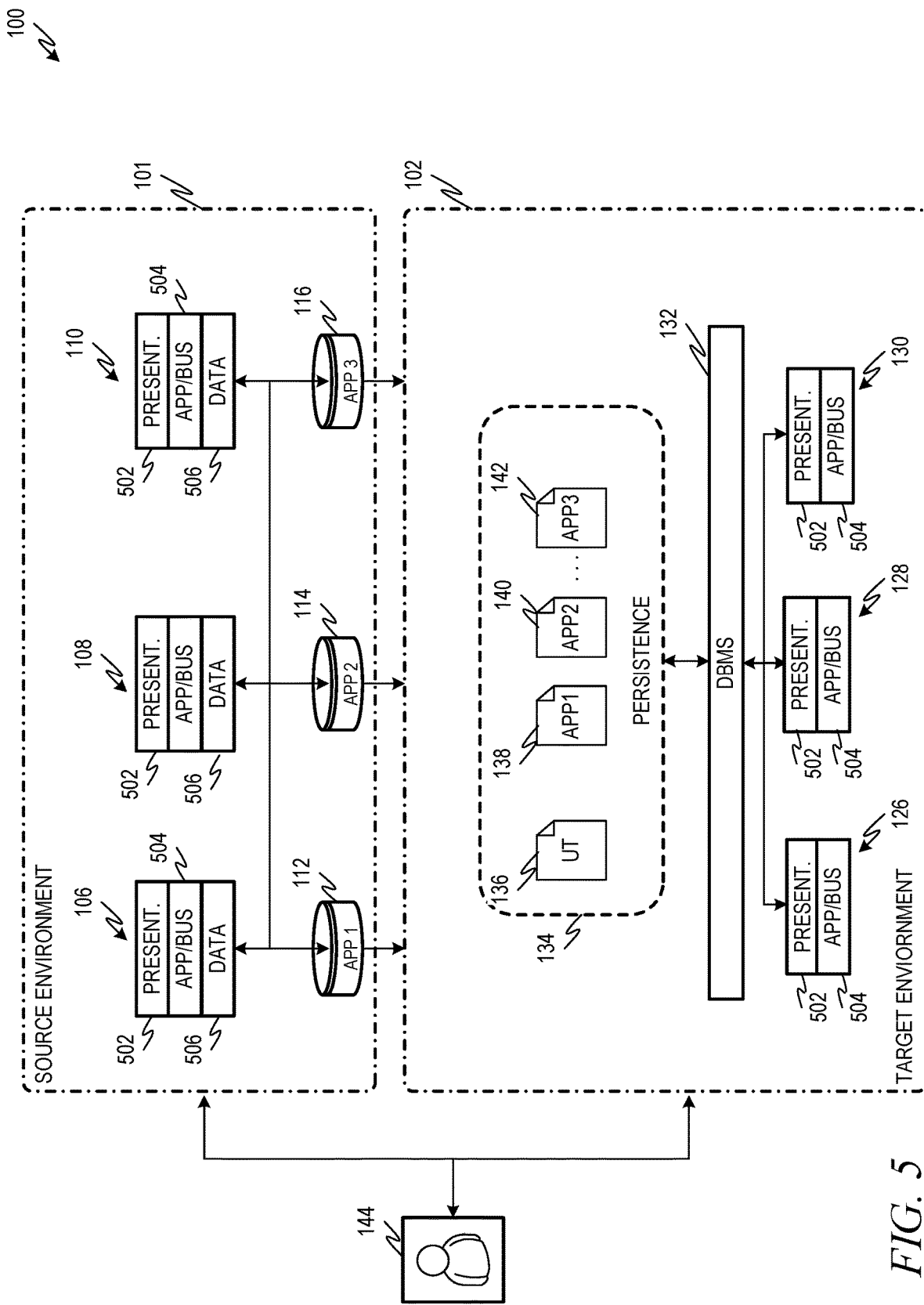
FIG. 5 is a diagram showing another example of the arrangement of FIG. 1 including details of the source applications and the target applications.

FIG. 5 is a diagram showing another example of the arrangement 100 including details of the source applications 106, 108, 110 and the target applications 126, 128, 130. In the example of FIG. 5, the source applications 106, 108, 110 are constructed according to a three-layer model including respective presentation layers 502, application/business layers 504, and data layers 506. The respective presentation layers 502 may generate user interfaces provided to users from the user group 144 who utilize the source applications 106, 108, 110.

The respective application/business layers 504 execute logic for performing the functionality of the respective source applications 106, 108, 110. For example, a source application 106, 108, 110 for managing payroll may include code at the application/business layer for retrieving employee data and using the employee data to generate paychecks. Applications with other functionalities may also have those functionalities implemented in respective application/business layers.

In the example of FIG. 5, the source applications 106, 108, 110 also include respective data layers 506. The respective data layers 506 comprise logic for accessing data storage including the source application databases 112, 114, 116. For example, the respective data layers 506 may comprise logic for interfacing with the various source application databases 112, 114, 116 including the different schema and/or different table structures. The respective application/business layers 504 may communicate with the respective data layers 506 via an application programming interface (API). For example, the application/business layers 504 may direct API requests to the respective data layers 506 to obtain data objects for processing at the respective application/business layers 504.

The respective data layers 506 may be programmed to structure queries, views, etc., to retrieve the data requested via the API and return the results to the requesting application/business layer 504. Consider an example in which the source application 106 utilizes data stored at the source application database 114 of the source application 108. When the application 106 requests a read or write transaction to the database 114, the application/business layer 504 of the source application 106 may make an API call to the data layer 506 of the source application 106. The data layer 506 interfaces with the database 114 and may format or otherwise modify any received data to a format that is recognizable by the source application 106. For example, the source application 106 may expect to receive dates in one format (e.g., mm/dd/yyyy) while the database 114 may store dates in a different format (e.g., dd/mm/yyyy). The data layer 506 may transform the data from one format to another.

After the migration performed by the migration tool 104 as described herein, legacy data from the source application databases 112, 114, 116 may be stored at the DBMS instance 132 as described herein. For example, common data fields from the source application databases 112, 114, 116 may be stored at the unified table 136 and at one or more of the custom application tables 138, 140, 142. Accordingly, when target applications 126, 128, 130 are to access data objects, each individual application 126, 128, 130 may access the unified table 136 and (optionally) one custom application table 138, 140, 142.

One potential benefit of this arrangement is that, in some examples, the target applications 126, 128, 130 (e.g., the application/business layers 504 thereof) may be mapped directly to the unified table 136 and (optionally) a respective custom application table 138, 140, 142. For example, queries, views, and the like to access one or two tables may not be significantly more complex than the API calls to a data layer 506. This may allow target applications 126, 128, 130 to be implemented as services with a data layer. This may reduce the computing resources used to execute the target applications 126, 128, 130. In some examples, the target applications 126, 128, 130 are cloud-native applications or other applications arranged according to a microservice architecture. In a microservice architecture, an instance of a software application is implemented by a collection of loosely-coupled microservices executing at the cloud environment. Each microservice may also include a single executable or limited set of executables that execute in a separate virtual machine (VM) or container implemented by the cloud environment. In a microservice architecture, each microservice is programmed to perform a defined task or small set of tasks and interact with the other microservices in a defined way, for example, according to an API. In examples in which the target applications 126, 128, 130 are implemented according to a microservices architecture, omitting a data layer may involve omitting one or more microservices and, for example, directing API calls from microservices at the application/business layer 504 directly to the DBMS instance 132.

Figure 6:
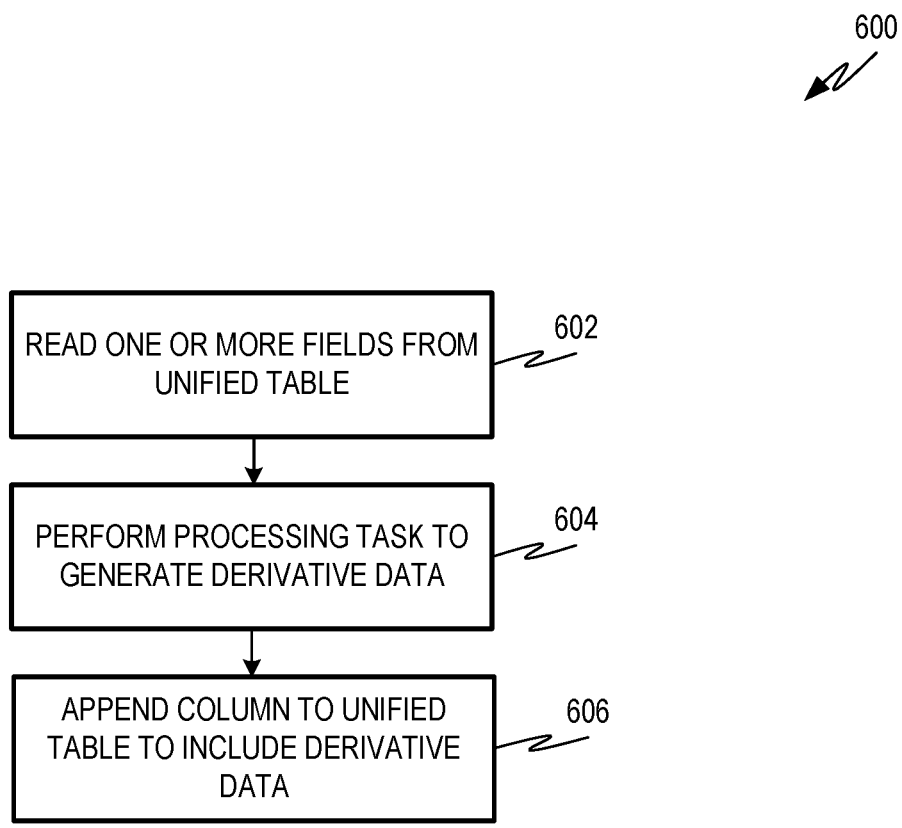
FIG. 6 is a flowchart showing one example of a process flow that can be executed in the target environment of FIG. 1 to update the unified table.

FIG. 6 is a flowchart showing one example of a process flow 600 that can be executed in the target environment 102 of FIG. 1 to update the unified table 136. For example, the process flow 600 may be executed after migration from the source environment 101.

At operation 602, the DBMS instance 132 may read one or more fields from a record at the unified table 136. For example, the DBMS instance 132 may read the one or more fields in response to a call from an application/business layer 504 of one or more of the target applications 126, 128, 130. The DBMS instance 132 may return the data from the read fields to the requesting target application 126, 128, 130.

At operation 604, the target application 126, 128, 130 performs processing using the received data. This generates derivative data that may be utilized by one or more of the other applications 126, 128, 130. At operation 606, the derivative data is appended to the unified table 136 as a new column. In examples where the unified table 136 is a columnar, a new column may be appended to the remainder of the table. For example, the target application 126, 128, 130 may request storage of the derivative data in a message to the DBMS instance 132. The DBMS instance 132 may write the derivative data to the unified table 136, for example, by appending a column to the unified. table 136.

Figure 7:
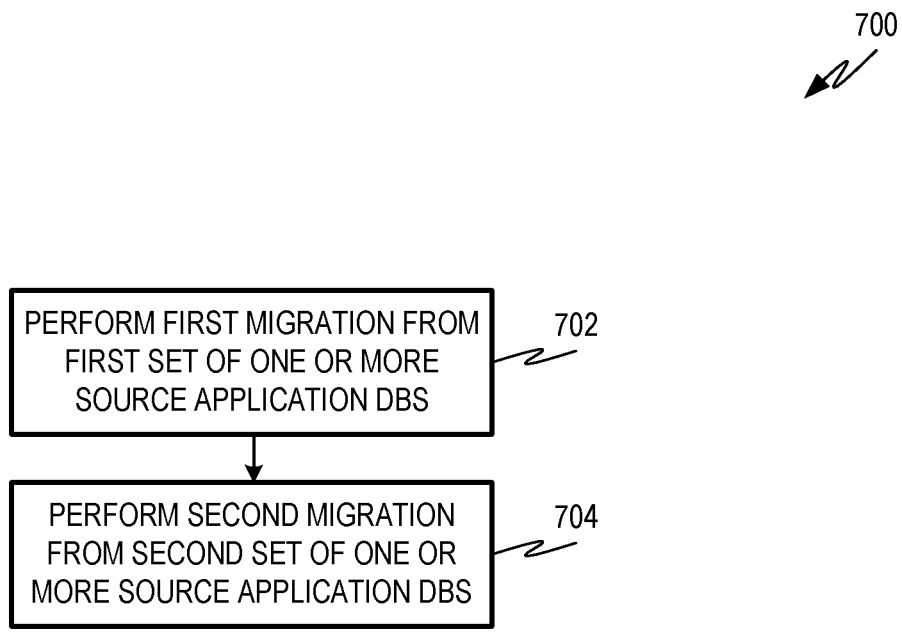
FIG. 7 is a flowchart showing one example of a process flow that may be executed by the migration tool of FIG. 1 to perform multiple migrations and/or a multi-stage migration.

FIG. 7 is a flowchart showing one example of a process flow 700 that may be executed by the migration tool 104 to perform multiple migrations and/or a multi-stage migration. In some examples, the structure of the unified table 136 may facilitate multiple migrations or multi-stage migrations. For example, an enterprise may desire to migrate some source applications to the target environment 102 at one time while leaving other source applications at the source environment 101 and/or a different source environment. The enterprise may later desire to migrate one or more additional source applications to the target environment 102.

At operation 702, the migration tool 104 may perform a first migration to the target environment 102, for example, as described herein. At operation 704, the migration tool 104 may perform a second migration. The second migration may include mapping one or more fields from one or more additional source tables to the unified table generated at the first migration from operation 702. Some of the fields from the additional source table or tables may map to columns that already exist at the unified table 136. Other fields from the one or more additional source tables may not map directly to existing columns of the unified table 136. For these mappings, the migration tool 104 may add one or more corresponding columns to the unified table 136. In examples where the unified table 136 is a columnar table, this may include appending the additional columns to the existing unified table 136 and may not require reconfiguring or reformatting the unified table 136 generated in the first migration at operation 702.

In view of the disclosure above, various examples are set forth below. It should be noted that one or more features of an example, taken in isolation or combination, should be considered within the disclosure of this application.

EXAMPLES

Example 1 is a system of migrating persistences of a plurality of applications to a target environment, the system comprising: at least one processor being programmed to execute operations comprising: accessing, by a migration tool, a first source table associated with a first application of the plurality of applications; accessing, by the migration tool, a second source table associated with a second application of the plurality of applications; generating, by the migration tool, mapping data relating the first source table and the second source table to a unified table, the mapping data relating a first field of the first source table to a first column of the unified table, the mapping data also relating a first field of the second source table to the first column of the unified table; migrating, by the migration tool and using the mapping data, migration data from the first source table and the second source table to a set of unified table, the unified table being implemented at a database management system executing at the target environment; and executing, at the target environment, a first target application corresponding to the first application, the first target application being mapped to the unified table to access at least a portion of the migration data.

In Example 2, the subject matter of Example 1 optionally includes the unified table being a columnar table, the operations the operations further comprising: after migrating the migration data from the first source table and the second source table to the unified table, accessing, by the migration tool, a third source table from a third source database associated with a third application; generating, by the migration tool, second mapping data relating at least one field of the third source table to the unified table; and migrating, by the migration tool and using the second mapping data, migration data from the third source table to the unified table, the migrating of the migration data from the third source table comprising adding a column to the unified table, the added column corresponding to a first field of the third source table.

In Example 3, the subject matter of any one or more of Examples 1-2 optionally includes the operations further comprising: determining, by the migration tool, that a second field of the first source table is a custom field for the first application; and migrating, by the migration tool, migration data from the second field to a first application table implemented at the database management system.

In Example 4, the subject matter of any one or more of Examples 1-3 optionally includes the operations further comprising: extracting, by the migration tool, a first portion of the migration data from the first source table; extracting, by the migration tool, a second portion of the migration data from the second source table; writing, by the migration tool, the first portion of the migration data and the second portion of the migration data to a staging data structure; and writing, by the migration tool, the first portion of the migration data and the second portion of the migration data to the unified table.

In Example 5, the subject matter of Example 4 optionally includes the operations further comprising generating, by the migration tool, audit data describing the mapping data, the first field of the first source table, and the first field of the second source table.

In Example 6, the subject matter of any one or more of Examples 1-5 optionally includes the generating of the mapping data comprising determining, by the migration tool, that first field of the first source table comprises foreign key data pointing to the first field of the second source table.

In Example 7, the subject matter of any one or more of Examples 1-6 optionally includes the operations further comprising: accessing a first record, by the first target application and from the unified table, the first record comprising a first field value corresponding to the first column of the unified table; using the first field value to generate derivative data; and appending a second column to the unified table, the second column comprising the derivative data.

In Example 8, the subject matter of any one or more of Examples 1-7 optionally includes the first source table being from a first source database associated with the first application and the second source table being from a second source database associated with the second application.

Example 9 is a method of migrating persistences of a plurality of applications to a target environment, the method comprising: accessing, by a migration tool, a first source table associated with a first application of the plurality of applications; accessing, by the migration tool, a second source table associated with a second application of the plurality of applications; generating, by the migration tool, mapping data relating the first source table and the second source table to a unified table, the mapping data relating a first field of the first source table to a first column of the unified table, the mapping data also relating a first field of the second source table to the first column of the unified table; migrating, by the migration tool and using the mapping data, migration data from the first source table and the second source table to the unified table, the unified table being implemented at a database management system executing at the target environment; and executing, at the target environment, a first target application corresponding to the first application, the first target application being mapped to the unified table to access at least a portion of the migration data.

In Example 10, the subject matter of Example 9 optionally includes the unified table being a columnar table, the method further comprising: after migrating the migration data from the first source table and the second source table to the unified table, accessing, by the migration tool, a third source table from a third source database associated with a third application; generating, by the migration tool, second mapping data relating at least one field of the third source table to the unified table; and migrating, by the migration tool and using the second mapping data, migration data from the third source table to the unified table, the migrating of the migration data from the third source table comprising adding a column to the unified table, the added column corresponding to a first field of the third source table.

In Example 11, the subject matter of any one or more of Examples 9-10 optionally includes determining, by the migration tool, that a second field of the first source table is a custom field for the first application; and migrating, by the migration tool, migration data from the second field to a first application table implemented at the database management system.

In Example 12, the subject matter of any one or more of Examples 9-11 optionally includes extracting, by the migration tool, a first portion of the migration data from the first source table; extracting, by the migration tool, a second portion of the migration data from the second source table; writing, by the migration tool, the first portion of the migration data and the second portion of the migration data to a staging data structure; and writing, by the migration tool, the first portion of the migration data and the second portion of the migration data to the unified table.

In Example 13, the subject matter of Example 12 optionally includes generating, by the migration tool, audit data describing the mapping data, the first field of the first source table, and the first field of the second source table.

In Example 14, the subject matter of Example 13 optionally includes the generating of the mapping data comprising determining, by the migration tool, that first field of the first source table comprises foreign key data pointing to the first field of the second source table.

In Example 15, the subject matter of any one or more of Examples 9-14 optionally includes accessing a first record, by the first target application and from the unified table, the first record comprising a first field value corresponding to the first column of the unified table; using the first field value to generate derivative data; and appending a second column to the unified table, the second column comprising the derivative data.

In Example 16, the subject matter of any one or more of Examples 9-15 optionally includes the first source table being from a first source database associated with the first application and the second source table being from a second source database associated with the second application.

Example 17 is a non-transitory machine-readable medium comprising instructions thereon that, when executed by at least one processor, cause the at least one processor to execute operations comprising: accessing, by a migration tool at a target environment, a first source table associated with a first application of a plurality of applications; accessing, by the migration tool, a second source table associated with a second application of the plurality of applications; generating, by the migration tool, mapping data relating the first source table and the second source table to a unified table, the mapping data relating a first field of the first source table to a first column of the unified table, the mapping data also relating a first field of the second source table to the first column of the unified table; migrating, by the migration tool and using the mapping data, migration data from the first source table and the second source table to the unified table, the unified table being implemented at a database management system executing at the target environment; and executing, at the target environment, a first target application corresponding to the first application, the first target application being mapped to the unified table to access at least a portion of the migration data.

In Example 18, the subject matter of Example 17 optionally includes the unified table being a columnar table, the operations the operations further comprising: after migrating the migration data from the first source table and the second source table to the unified table, accessing, by the migration tool, a third source table from a third source database associated with a third application; generating, by the migration tool, second mapping data relating at least one field of the third source table to the unified table; and migrating, by the migration tool and using the second mapping data, migration data from the third source table to the unified table, the migrating of the migration data from the third source table comprising adding a column to the unified table, the added column corresponding to a first field of the third source table.

In Example 19, the subject matter of any one or more of Examples 17-18 optionally includes the operations further comprising: determining, by the migration tool, that a second field of the first source table is a custom field for the first application; and migrating, by the migration tool, migration data from the second field to a first application table implemented at the database management system.

In Example 20, the subject matter of any one or more of Examples 17-19 optionally includes the operations further comprising: extracting, by the migration tool, a first portion of the migration data from the first source table; extracting, by the migration tool, a second portion of the migration data from the second source table; writing, by the migration tool, the first portion of the migration data and the second portion of the migration data to a staging data structure; and writing, by the migration tool, the first portion of the migration data and the second portion of the migration data to the unified table.

Figure 8:
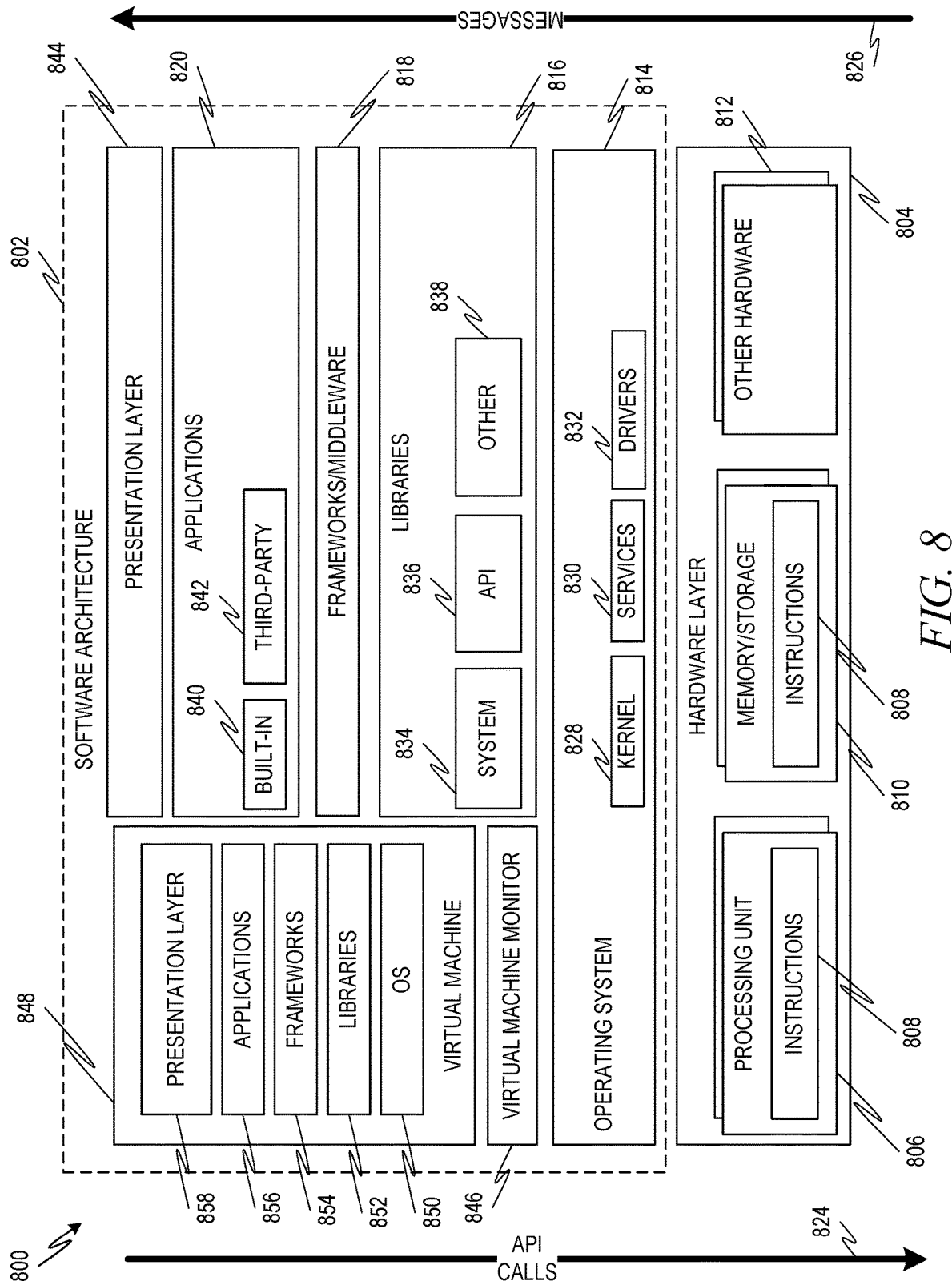
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 includes built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system 834, APIs 836, and other libraries 838), and frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
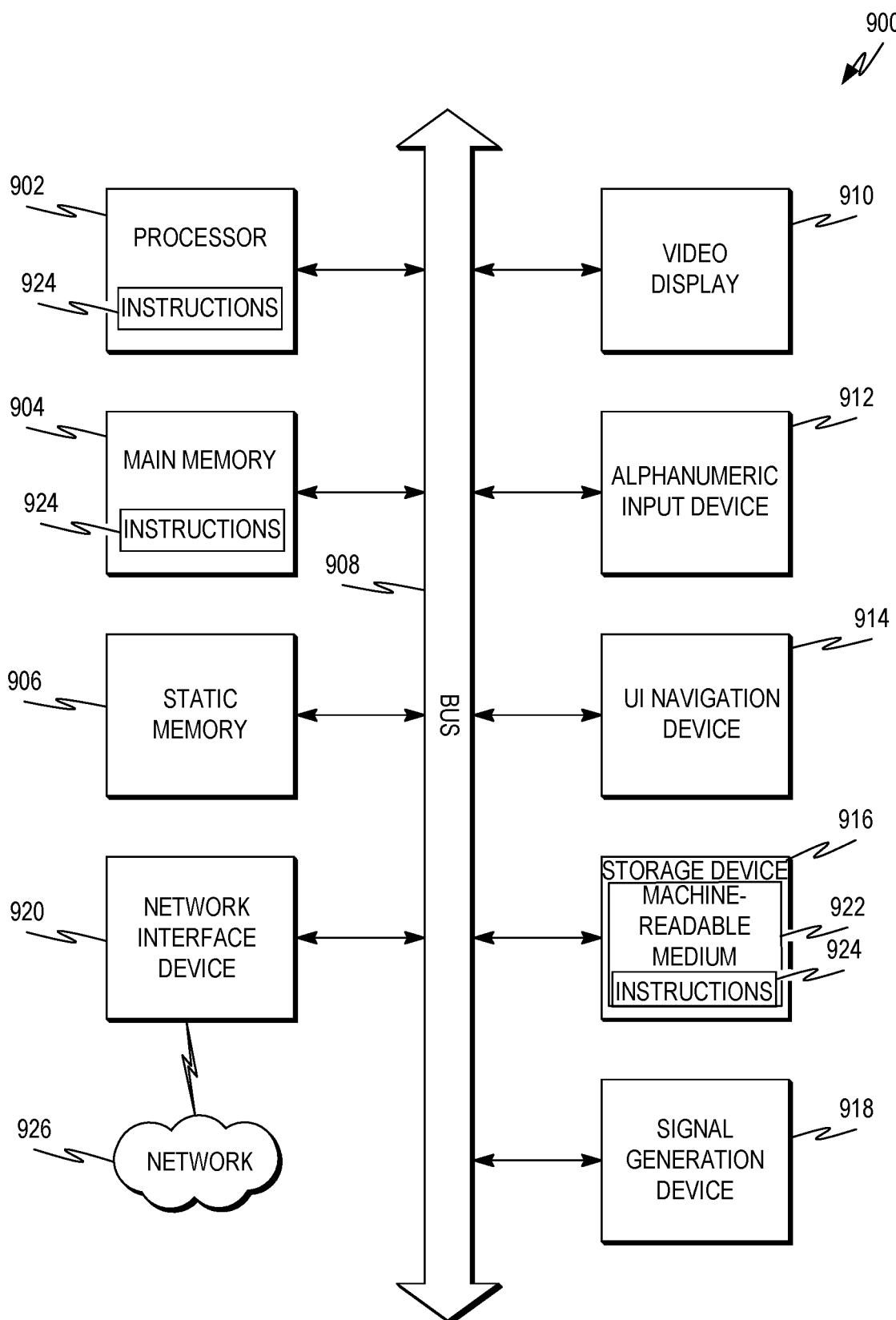
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system of migrating persistences of a plurality of applications to a target environment, the system comprising:
at least one processor being programmed to execute operations comprising:
accessing, by a migration tool, a first source table associated with a first application of the plurality of applications;
accessing, by the migration tool, a second source table associated with a second application of the plurality of applications;
generating, by the migration tool, mapping data relating the first source table and the second source table to a unified table, the mapping data relating a first field of the first source table to a first column of the unified table, the mapping data also relating a first field of the second source table to the first column of the unified table;
migrating, by the migration tool and using the mapping data, migration data from the first source table and the second source table to a unified table, the unified table being implemented at a database management system executing at the target environment;
executing, at the target environment, a first target application corresponding to the first application, the first target application being mapped to the unified table to access at least a portion of the migration data; and
executing, at the target environment, a second target application corresponding to the second application, the second target application being mapped to the unified table to access at least a portion of the migration data.

2. The system of claim 1, the unified table being a columnar table, the operations the operations further comprising:
after migrating the migration data from the first source table and the second source table to the unified table, accessing, by the migration tool, a third source table from a third source database associated with a third application;
generating, by the migration tool, second mapping data relating at least one field of the third source table to the unified table; and
migrating, by the migration tool and using the second mapping data, migration data from the third source table to the unified table, the migrating of the migration data from the third source table comprising adding a column to the unified table, the added column corresponding to a first field of the third source table.

3. The system of claim 1, the operations further comprising:
determining, by the migration tool, that a second field of the first source table is a custom field for the first application; and
migrating, by the migration tool, migration data from the second field to a first application table implemented at the database management system.

4. The system of claim 1, the operations further comprising:
extracting, by the migration tool, a first portion of the migration data from the first source table;
extracting, by the migration tool, a second portion of the migration data from the second source table;
writing, by the migration tool, the first portion of the migration data and the second portion of the migration data to a staging data structure; and
writing, by the migration tool, the first portion of the migration data and the second portion of the migration data to the unified table.

5. The system of claim 4, the operations further comprising generating, by the migration tool, audit data describing the mapping data, the first field of the first source table, and the first field of the second source table.

6. The system of claim 1, the generating of the mapping data comprising determining, by the migration tool, that first field of the first source table comprises foreign key data pointing to the first field of the second source table.

7. The system of claim 1, the operations further comprising:
accessing a first record, by the first target application and from the unified table, the first record comprising a first field value corresponding to the first column of the unified table;
using the first field value to generate derivative data; and
appending a second column to the unified table, the second column comprising the derivative data.

8. The system of claim 1, the first source table being from a first source database associated with the first application and the second source table being from a second source database associated with the second application.

9. A method of migrating persistences of a plurality of applications to a target environment, the method comprising:
accessing, by a migration tool, a first source table associated with a first application of the plurality of applications;
accessing, by the migration tool, a second source table associated with a second application of the plurality of applications;

generating, by the migration tool, mapping data relating the first source table and the second source table to a unified table, the mapping data relating a first field of the first source table to a first column of the unified table, the mapping data also relating a first field of the second source table to the first column of the unified table;

migrating, by the migration tool and using the mapping data, migration data from the first source table and the second source table to the unified table, the unified table being implemented at a database management system executing at the target environment; executing, at the target environment, a first target application corresponding to the first application, the first target application being mapped to the unified table to access at least a portion of the migration data; and executing, at the target environment, a second target application corresponding to the second application, the second target application being mapped to the unified table to access at least a portion of the migration data.

10. The method of claim 9, the unified table being a columnar table, the method further comprising:

after migrating the migration data from the first source table and the second source table to the unified table, accessing, by the migration tool, a third source table from a third source database associated with a third application;

generating, by the migration tool, second mapping data relating at least one field of the third source table to the unified table; and migrating, by the migration tool and using the second mapping data, migration data from the third source table to the unified table, the migrating of the migration data from the third source table comprising adding a column to the unified table, the added column corresponding to a first field of the third source table.

11. The method of claim 9, further comprising:

determining, by the migration tool, that a second field of the first source table is a custom field for the first application; and migrating, by the migration tool, migration data from the second field to a first application table implemented at the database management system.

12. The method of claim 9, further comprising:

extracting, by the migration tool, a first portion of the migration data from the first source table;

extracting, by the migration tool, a second portion of the migration data from the second source table;

writing, by the migration tool, the first portion of the migration data and the second portion of the migration data to a staging data structure; and writing, by the migration tool, the first portion of the migration data and the second portion of the migration data to the unified table.

13. The method of claim 12, further comprising generating, by the migration tool, audit data describing the mapping data, the first field of the first source table, and the first field of the second source table.

14. The method of claim 13, the generating of the mapping data comprising determining, by the migration tool, that first field of the first source table comprises foreign key data pointing to the first field of the second source table.

15. The method of claim 9, further comprising:

accessing a first record, by the first target application and from the unified table, the first record comprising a first field value corresponding to the first column of the unified table;

using the first field value to generate derivative data; and appending a second column to the unified table, the second column comprising the derivative data.

16. The method of claim 9, the first source table being from a first source database associated with the first application and the second source table being from a second source database associated with the second application.

17. A non-transitory machine-readable medium comprising instructions thereon that, when executed by at least one processor, cause the at least one processor to execute operations comprising:

accessing, by a migration tool at a target environment, a first source table associated with a first application of a plurality of applications;

accessing, by the migration tool, a second source table associated with a second application of the plurality of applications;

generating, by the migration tool, mapping data relating the first source table and the second source table to a unified table, the mapping data relating a first field of the first source table to a first column of the unified table, the mapping data also relating a first field of the second source table to the first column of the unified table;

migrating, by the migration tool and using the mapping data, migration data from the first source table and the second source table to the unified table, the unified table being implemented at a database management system executing at the target environment;

executing, at the target environment, a first target application corresponding to the first application, the first target application being mapped to the unified table to access at least a portion of the migration data; and executing, at the target environment, a second target application corresponding to the second application, the second target application being mapped to the unified table to access at least a portion of the migration data.

18. The medium of claim 17, the unified table being a columnar table, the operations the operations further comprising:

after migrating the migration data from the first source table and the second source table to the unified table, accessing, by the migration tool, a third source table from a third source database associated with a third application;

generating, by the migration tool, second mapping data relating at least one field of the third source table to the unified table; and migrating, by the migration tool and using the second mapping data, migration data from the third source table to the unified table, the migrating of the migration data from the third source table comprising adding a column to the unified table, the added column corresponding to a first field of the third source table.

19. The medium of claim 17, the operations further comprising:

determining, by the migration tool, that a second field of the first source table is a custom field for the first application; and migrating, by the migration tool, migration data from the second field to a first application table implemented at the database management system.

20. The medium of claim 17, the operations further comprising:
- extracting, by the migration tool, a first portion of the migration data from the first source table;
- extracting, by the migration tool, a second portion of the migration data from the second source table;
- writing, by the migration tool, the first portion of the migration data and the second portion of the migration data to a staging data structure; and
- writing, by the migration tool, the first portion of the migration data and the second portion of the migration data to the unified table.

* * * * *